United States Patent
Golm et al.

(10) Patent No.: US 11,345,281 B2
(45) Date of Patent: May 31, 2022

(54) SHAPE CHANGING MIRROR

(71) Applicant: GM GLOBAL TECHNOLOGY OPERATIONS LLC, Detroit, MI (US)

(72) Inventors: Erik B. Golm, Warren, MI (US); Meng Jiang, Rochester Hills, MI (US); Shengbing Jiang, Rochester Hills, MI (US); Prakash Mohan Peranadam, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 346 days.

(21) Appl. No.: 16/792,701

(22) Filed: Feb. 17, 2020

(65) Prior Publication Data
US 2021/0253026 A1  Aug. 19, 2021

(51) Int. Cl.
| B60R 1/07 | (2006.01) |
| G02B 26/08 | (2006.01) |
| G02B 1/18 | (2015.01) |
| G02B 1/14 | (2015.01) |

(52) U.S. Cl.
CPC .................. B60R 1/07 (2013.01); G02B 1/14 (2015.01); G02B 1/18 (2015.01); G02B 26/0825 (2013.01)

(58) Field of Classification Search
CPC .. B60R 1/07; B60R 1/072; B60R 1/08; B60R 1/025; B60R 1/081; G02B 1/14; G02B 1/18; G02B 26/0825; G02B 7/185
USPC .......................................................... 359/846
See application file for complete search history.

(56) References Cited

U.S. PATENT DOCUMENTS

| 5,719,846 | A  * | 2/1998 | Matoba ................ G11B 7/1362 369/53.2 |
| 10,365,473 | B1 * | 7/2019 | Alzaydi ............. G02B 26/0825 |
| 2002/0080089 | A1 * | 6/2002 | Bergstedt ............. H01Q 15/148 343/912 |
| 2007/0058118 | A1 * | 3/2007 | Cirkel ................. G02F 1/13363 349/117 |
| 2008/0192215 | A1 * | 8/2008 | Gellrich ................... G02B 1/18 355/30 |
| 2011/0222176 | A1 * | 9/2011 | Browne ................. B60R 1/072 359/872 |
| 2013/0070356 | A1 * | 3/2013 | Carnet ................... G02B 7/183 359/849 |

* cited by examiner

*Primary Examiner* — Stephone B Allen
*Assistant Examiner* — Rahman Abdur
(74) *Attorney, Agent, or Firm* — Vivacqua Crane PLLC

(57) ABSTRACT

A mirror assembly includes a mirror housing and a mirror. The mirror is supported by the mirror housing. The mirror has an outer reflective surface. The mirror is bendable between a flat shape and a fisheye shape. The mirror assembly further includes an actuator assembly coupled to the mirror. Upon actuation, the actuator assembly is configured to bend the mirror between the flat shape and the fisheye shape to adjust a field of view of the mirror.

16 Claims, 11 Drawing Sheets

SHAPE CHANGING MIRROR

INTRODUCTION

The present disclosure generally relates to a shape changing mirror, and more particularly, to a mirror assembly including a mirror and a mechanism configured to bend the mirror to a position that increases the field of view for a driver.

While some vehicle side mirrors include a blind spot alarm, it is desirable to develop a mechanism to increase the field of view of the driver looking at a side mirror.

SUMMARY

The present disclosure relates to an exterior mirror on a vehicle that is capable of being bent. This exterior mirror may be automatically bent to create a fisheye view and increase the field of view of the driver when merging or during lane change. The mirror may be bent using, for example, one or more solenoid to reveal a full bind spot mirror. The shape of the mirror may be changed according to vehicle maneuvers.

The present disclosure describes a mirror assembly for a vehicle. The mirror assembly includes a mirror housing and a mirror supported by the mirror housing. The mirror has an outer reflective surface. The mirror is bendable between a flat shape and a fisheye shape. The mirror assembly further includes an actuator assembly coupled to the mirror. Upon actuation, the actuator assembly is configured to bend the mirror between the flat shape and the fisheye shape to adjust a field of view of the mirror.

In an aspect of the present disclosure, the field of view of the mirror is greater when the mirror has the fisheye shape than when the mirror has the flat shape. The outer reflective surface has a first curvature. When the mirror has the fisheye shape, the outer reflective surface has a second curvature. The second curvature is greater than the first curvature. The first curvature is zero.

In an aspect of the present disclosure, the mirror has an innermost mirror surface. The innermost mirror surface is opposite the outer reflective surface. The actuator assembly further includes a plurality of permanent magnets. Each of the plurality of permanent magnets is directly coupled to the innermost mirror surface of the mirror. The actuator assembly includes an actuator housing and a plurality of legs extending directly from the actuator housing. Each of the plurality of legs includes a first leg end and a second leg end opposite the first leg end. The first leg end of each of the plurality of legs is directly coupled to the actuator housing. The second leg end of each of the plurality of legs is spaced apart from the actuator housing. The actuator assembly further includes a plurality of electromagnets. Each of the plurality of electromagnets is directly coupled to the second leg end of one of the plurality of legs. Each of the plurality of electromagnets is disposed adjacent one of the plurality of the magnets. The actuator assembly further includes a plurality of wires. Each of the plurality of wires is electrically connected to one of the plurality of electromagnets. The plurality of electromagnets is configured to receive electrical energy to draw the plurality of permanent magnets toward the plurality of electromagnets to bend the mirror from the flat shape to the fisheye shape.

In an aspect of the present disclosure, the mirror has an innermost mirror surface, and the innermost mirror surface is opposite the outer reflective surface. The actuator assembly further includes a plurality of blocks. Each of the plurality of blocks is directly coupled to the innermost mirror surface of the mirror. The actuator assembly includes an actuator housing and a plurality of legs extending directly from the actuator housing. Each of the plurality of legs includes a first leg end and a second leg end opposite the first leg end. The first leg end of each of the plurality of legs is directly coupled to the actuator housing. The second leg end of each of the plurality of legs is spaced apart from the actuator housing. The actuator assembly further includes a plurality of linear solenoids. Each of the plurality of linear solenoids is directly coupled to the second leg end of one of the plurality of legs. Each of the plurality of linear solenoids is directly and permanently coupled to one of the plurality of the blocks. The actuator assembly further includes a plurality of wires. Each of the plurality of wires is electrically connected to one of the plurality of linear solenoids. The plurality of linear solenoids is configured to receive electrical energy to pull the plurality of blocks toward the second leg end of the respective one of the plurality of legs to bend the mirror from the flat shape to the fisheye shape.

In an aspect of the present disclosure, the mirror has an innermost mirror surface, and the innermost mirror surface is opposite the outer reflective surface. The actuator assembly further includes a single block. The single block has a fisheye shape. The single block is in direct contact with the innermost mirror surface. The actuator assembly includes an actuator housing. The actuator housing is coupled to the mirror at the innermost mirror surface. The actuator housing is configured as a bracket. The actuator assembly includes a single linear solenoid. The single linear solenoid is coupled between the actuator housing and the single block. The single linear solenoid is configured to receive electrical energy to push the single block, causing the mirror to bend from the flat shape to the fisheye shape.

In an aspect of the present disclosure, the mirror has an innermost mirror surface, and the innermost mirror surface is opposite the outer reflective surface. The actuator assembly includes a block. The block is in direct contact with the innermost mirror surface. The actuator assembly includes a universal joint to allow rotation of the mirror. The actuator assembly includes a linear solenoid coupled to the universal joint. The linear solenoid is directly coupled to the block to allow the block to push the mirror upon receipt of electrical energy. The actuator assembly includes a linkage coupled between the innermost mirror surface and the block. The linear solenoid is configured to receive electrical energy to push the block, causing the mirror to bend from the flat shape to the fisheye shape.

In an aspect of the present disclosure, the mirror has an innermost mirror surface, and the innermost mirror surface is opposite the outer reflective surface. The actuator assembly includes an actuator housing coupled to the mirror. The actuator assembly includes a plurality of wires configured to carry electrical energy. The actuator assembly includes a plurality of electrical pads configured to carry electrical energy. Each of the plurality of electrical pads is connected to one of the plurality of wires. Each of the plurality of electrical pads is directly coupled to the innermost mirror surface of the mirror to supply the mirror with the electrical energy carried by the plurality of wires. The mirror includes an electroactive polymer such that, upon receipt of the electrical energy, a shape of the mirror changes from the flat shape to the fisheye shape.

In an aspect of the present disclosure, the mirror has an innermost mirror surface, and the innermost mirror surface is opposite the outer reflective surface. The actuator assembly includes a linkage coupled to the innermost mirror surface. The actuator assembly includes an actuator housing coupled to the linkage. The mirror assembly has an electric motor including a motor housing and a cam. Upon receipt of electric energy, the cam rotates about a rotational axis to push the mirror, causing the mirror to bend from the flat shape to the fisheye shape.

In an aspect of the present disclosure, only a portion of the mirror is bendable between the flat shape and the fisheye shape, and a reminder of the mirror remains flat.

In an aspect of the present disclosure, the mirror includes a coating layer. The coating layer includes silica and polytetrafluoroethylene. As such, the coating layer is hydrophobic and resistive to acid.

In an aspect of the present disclosure, the mirror is a flexible liquid-crystal display (LCD).

In an aspect of the present disclosure, the mirror includes an outer mirror layer, a polymeric layer, and an antenna disposed between the outer mirror layer and the polymeric layer. The mirror layer coated with a material, such as stainless steel, stainless silver, aluminum or an alloy thereof, may optionally be used as both, a mirror layer and as an antenna layer for radio, 4G & 5G services. The combined mirror and antenna layer based on aluminum can be heated, thereby allowing the mirror to be heated cold environments.

In an aspect of the present disclosure, the mirror assembly further includes a controller in communication with the mirror, wherein the mirror assembly is part of a host vehicle. The controller is programmed to: determine whether a secondary vehicle is in a blind spot of the host vehicle; in response to determining that the secondary vehicle is in the blind spot of the host vehicle, determining whether a turn signal of the host vehicle has been activated; in response to determining that the turn signal has been activated, bend the mirror from the flat shape to the fisheye shape; determine whether the turn signal of the host vehicle has been deactivated; and in response to determining whether the turn signal of the host vehicle has been deactivated, bend the mirror from the fisheye shape to the flat shape.

In an aspect of the present disclosure, the mirror assembly further includes a controller in communication with the mirror, wherein the mirror assembly is part of a host vehicle. The controller is programmed to: receiving sensor data; determining a vehicle maneuver of the host vehicle based on the sensor data and a plurality of predetermined vehicle maneuvers; adjusting a shape of the mirror from the flat shape to the fisheye shape based on the vehicle maneuver; and readjusting the shape of the mirror from the fisheye shape to the flat shape upon completion of the vehicle maneuver.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 5A is a schematic isometric, partial view of the mirror assembly of FIG. 5.

DETAILED DESCRIPTION

The following detailed description is merely exemplary in nature and is not intended to limit the application and uses. Furthermore, there is no intention to be bound by expressed or implied theory presented in the preceding technical field, background, brief summary, or the following detailed description. As used herein, the term "module" refers to hardware, software, firmware, electronic control component, processing logic, and/or processor device, individually or in combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

Figure 1:
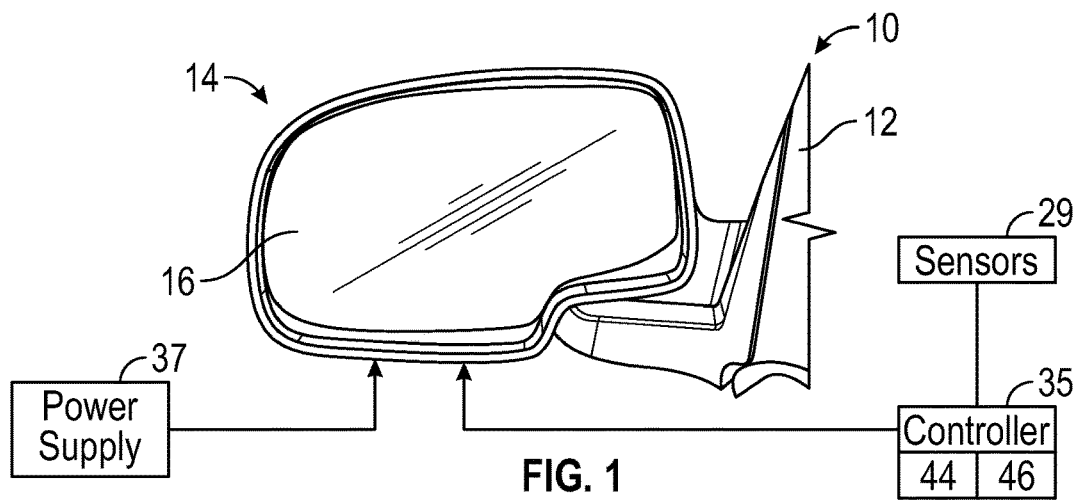
FIG. 1 is a schematic front view of a vehicle including a mirror assembly, a controller, and sensors.
Figure 2:
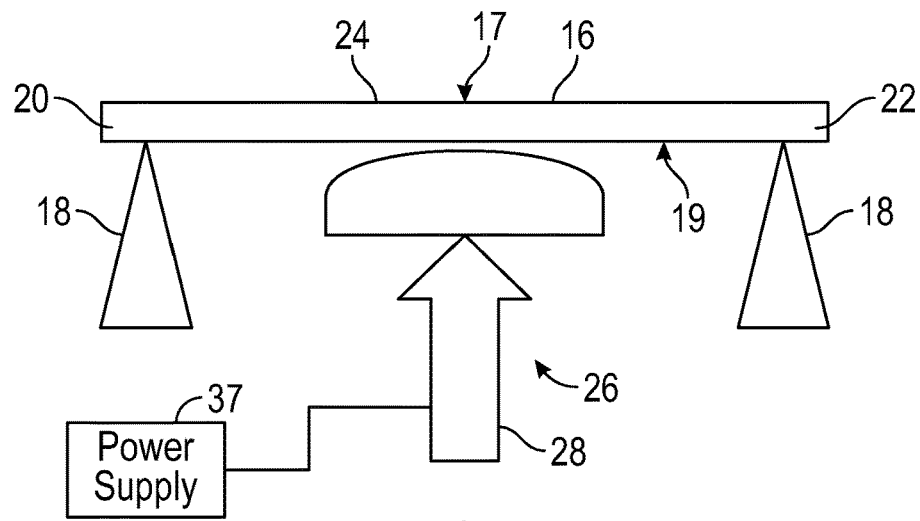
FIG. 2 is a schematic illustration of the mirror assembly of FIG. 1, wherein the mirror assembly includes a mirror, and the mirror has a flat shape.
Figure 3:
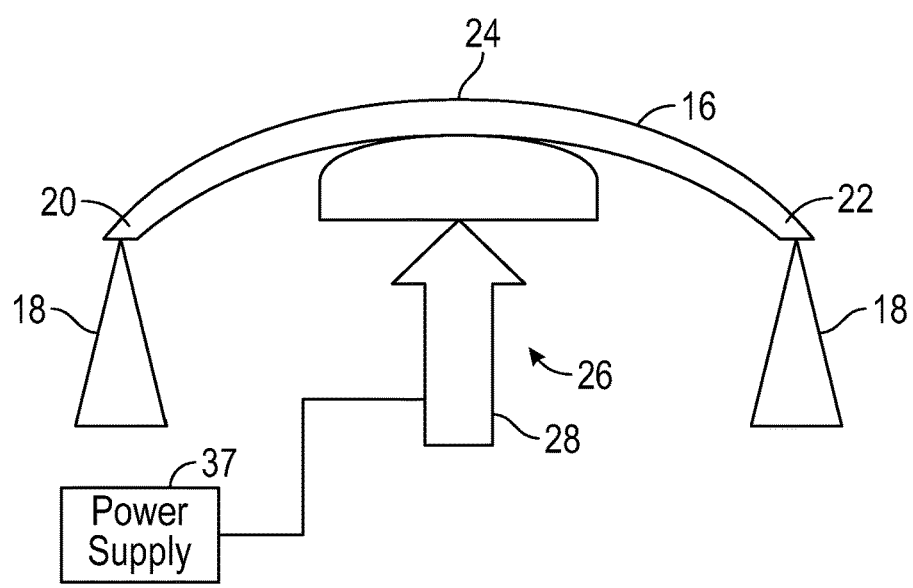
FIG. 3 is a schematic illustration of the mirror assembly of FIG. 1, wherein the mirror has a fisheye shape.

With reference to FIGS. 1, 2, and 3, a vehicle 10 includes a vehicle body 12 and a mirror assembly 14 coupled to the vehicle body 12. The vehicle 10 may also be referred to as host vehicle. The vehicle 10 includes a mirror assembly 14 that includes a mirror 16 and a mirror housing 18. The mirror housing 18 supports the mirror 16. The mirror 16 may be a side rearview mirror. The mirror 16 has a first lateral end 20 and a second lateral end 22 opposite the first lateral end 20. The mirror housing 18 fixes the first lateral end 20 and the second lateral end 22 in position, while allowing a central portion 24 of the mirror 16 to bend from a flat shape (FIG. 2) to a fisheye shape (FIG. 3). Thus, the mirror 16 is bendable between the flat shape (FIG. 2) and the fisheye shape (FIG. 3). The term "fisheye shape" means a shape that is the same as the shape of a fisheye lens. A fisheye lens is a wide-angle photographic lens that has a highly curved protruding front, that covers an angle of about 180 degrees, and that gives a circular image. Therefore, a "mirror having a fisheye shape" is a wide-angle mirror that has a highly curved protruding front, that covers an angle of about 180 degrees. The mirror 16 has an outer reflective surface 17 and an innermost mirror surface 19 opposite the outer reflective surface 17.

The mirror assembly 14 includes an actuator assembly 26 coupled to the mirror 16. Upon actuation, the actuator assembly 26 is configured to bend the mirror 16 from the flat shape to the fisheye shape to increase the field of view of the mirror 16. In particular, the actuator assembly 26 includes an actuator 28, such as solenoid, that pushes the central portion 24 of the mirror 16 to bend the mirror 16 from the flat shape to the fisheye shape. The field of view of the mirror 16 is greater when the mirror 16 has the fisheye shape than when the mirror 16 has the flat shape in order to allow a driver of the vehicle 10 to see another vehicle in the blind spot of the vehicle 10. Upon deactivation of the actuator assembly 26, the mirror 16 returns to its flat shape (FIG. 2). When the mirror has the flat shape, the outer reflective surface has a first curvature. The first curvature may be zero. When the mirror 16 has the fisheye shape, the outer reflective surface has a second curvature that is greater than the first curvature to increase the field of view of the mirror 16. The mirror 16 may be a flexible liquid-crystal display (LCD) screen. When activated, the LCD screen is displayed. When the LCD screen is deactivated, the mirror is displayed. The vehicle 10 may include a power supply 37 electrically connected to the actuator assembly 26 of the mirror assembly 14. Accordingly, the power supply 37 is configured to supply electrical energy to the actuator assembly 26 of the mirror assembly 14.

The vehicle 10 further includes a controller 35 in communication with the actuator assembly 26. The controller 35 includes at least one processor 44 and a non-transitory computer-readable storage device or media 46. The automated system processor 44 may be a custom-made or commercially available processor, a central processing unit (CPU), a graphics processing unit (GPU), an auxiliary processor among several processors associated with the controller 35, a semiconductor-based microprocessor (in the form of a microchip or chip set), a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or other electric, magnetic, optical, or combination memory devices capable of storing data, some of which represent executable instructions, used by the controller 35 in controlling the mirror assembly 14. The vehicle 10 may also include a plurality of sensors 29 in communication with the controller 35. The sensors 29 provide sensor data to the controller 35 and may include, but are not limited to, turning signal sensor, steering wheel angle sensor, gaze tracking sensor, transmission PRND selection sensor, blind spot sensor, among others.

The instructions may include one or more separate programs, each of which comprises an ordered listing of executable instructions for implementing logical functions. The instructions, when executed by the processor 44, receive and process signals from the sensors 29, perform logic, calculations, methods and/or algorithms for automatically controlling the components of the vehicle 10, and generate control signals that are transmitted to the actuator assembly 26 to automatically control the components of the vehicle 10 and/or the mirror assembly 14 based on the logic, calculations, methods, and/or algorithms. Although only one controller 35 is shown in FIG. 1, embodiments of the vehicle 10 may include a number of controllers 35 that communicate over suitable communication medium or a combination of communication mediums and that cooperate to process the sensor signals, perform logic, calculations, methods, and/or algorithms, and generate control signals to automatically control features of the mirror assembly 14.

Figure 4:
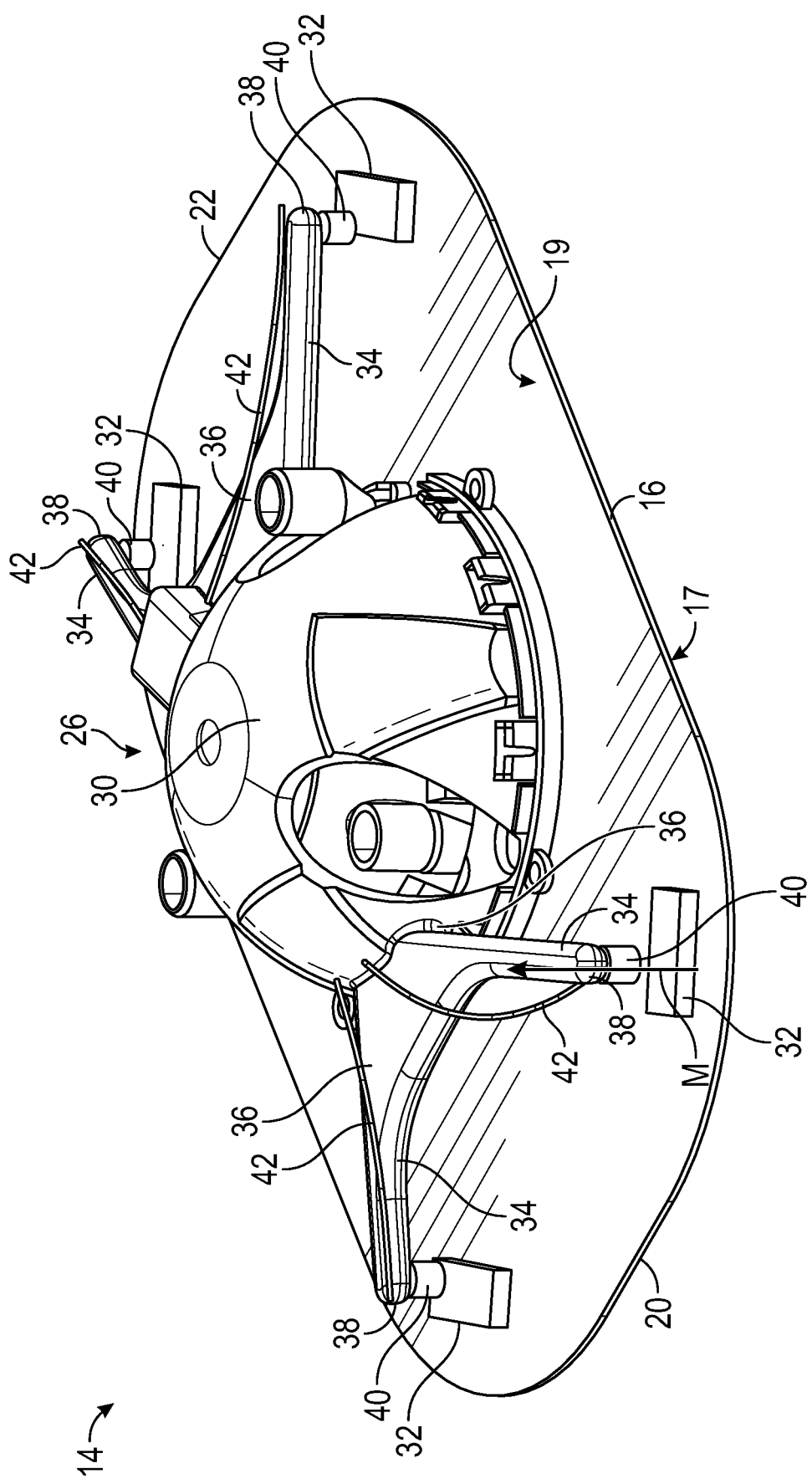
FIG. 4 is a schematic isometric view of a mirror assembly in accordance with an aspect of the present disclosure, wherein the mirror assembly includes electromagnets.

With reference to FIG. 4, the actuator assembly 26 includes an actuator housing 30 configured to rotate in order to rotate the mirror 16. The actuator housing 30 further includes a plurality of permanent magnets 32 or other suitable magnets. Each of the permanent magnets 32 is directly coupled to the innermost mirror surface 19 of the mirror 16 to enhance the structural integrity of the mirror assembly 14. The actuator assembly 26 further includes a plurality of legs 34 extending directly from the actuator housing 30 to enhance the structural integrity of the actuator assembly 26. Each of the legs 34 includes a first leg end 36 and a second leg end 38 opposite the first leg end 36. The first leg end 36 of each of the legs 34 is directly coupled to the actuator housing 30 to enhance the structural integrity of the actuator assembly 26. The second leg end 38 of each of the legs 34 is spaced apart from the actuator housing 30. The actuator assembly 26 further includes a plurality of electromagnets 40. Each of the electromagnets 40 is directly coupled to the second leg end 38 of a respective leg 34 to firmly secure the electromagnets 40 to the legs 34. Each of the electromagnets 40 is disposed adjacent to a respective permanent magnet 32 to allow the electromagnetic field generated by the electromagnets 40 to attract a respective permanent magnet 32. The actuator assembly 26 further includes a plurality of wires 42 each extending along a respective leg 34. Each of the wires 42 is electrically connected to a respective electromagnet 40. Further, each wire 42 is electrically connected to the power supply 37 (FIG. 1). The electromagnets 40 are configured to receive electrical energy from the power supply 37 to draw the permanent magnets 32 toward the electromagnets 40 to bend the mirror 16 from the flat shape to the fisheye shape, thereby increasing the field of view of the mirror 16. In other words, upon receipt of electrical energy, the electromagnets 40 produce an electromagnetic field to draw the permanent magnets 32 toward the electromagnets 40 in the direction indicated by arrow M (FIG. 4), thereby bending the mirror 16 from the flat shape to the fisheye shape. When the electromagnets 40 no longer receive electrical energy, the permanent magnets 32 detach from the electromagnets 40, allowing the mirror 16 to return to its flat shape. The electromagnets 40, the wires 42, and the permanent magnets 32 may collectively form magnetic clutches.

Figure 5:
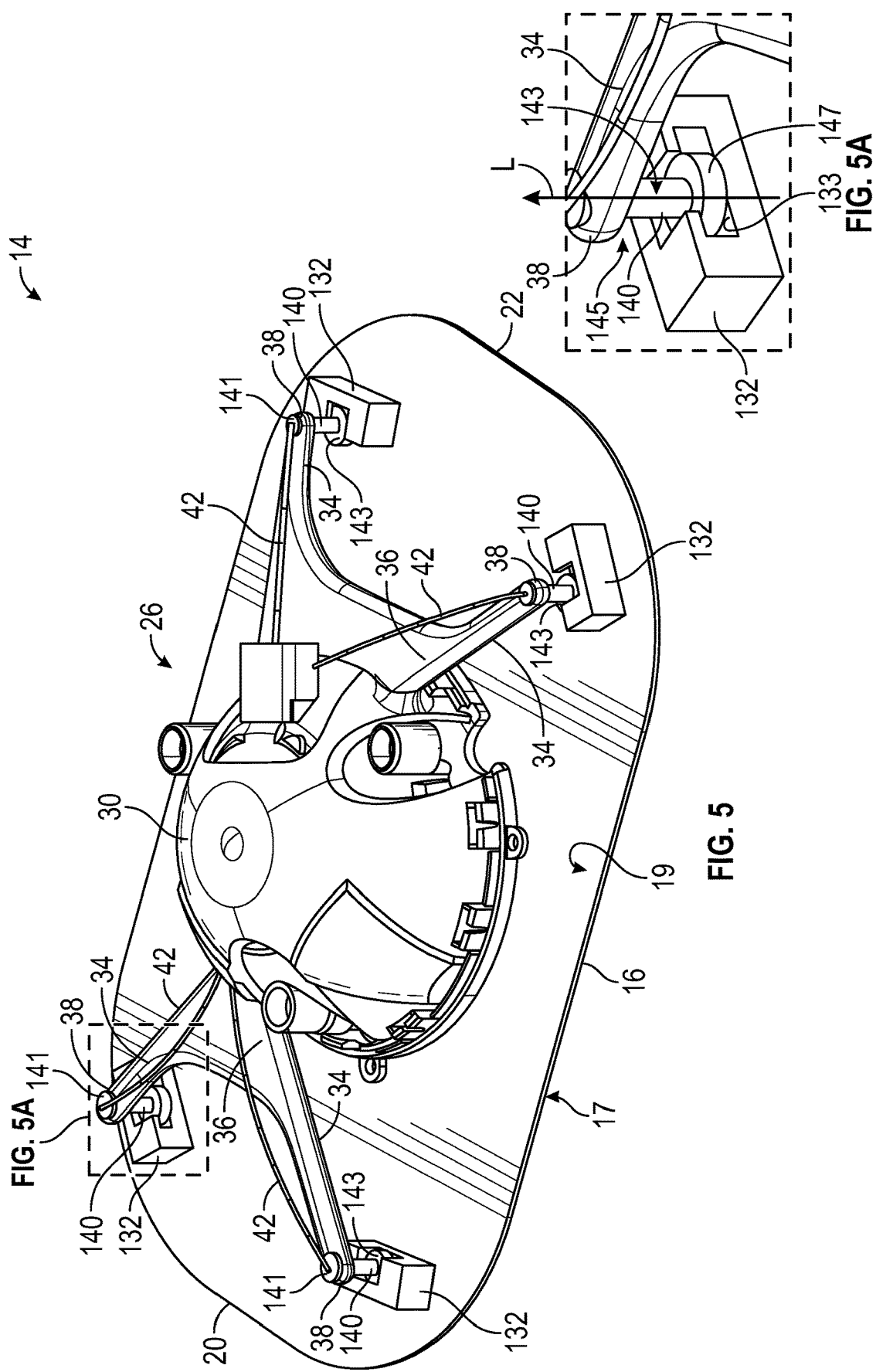
FIG. 5 is a schematic isometric view of a mirror assembly in accordance with an aspect of the present disclosure, wherein the mirror assembly includes linear solenoids.

With reference to FIGS. 5 and 5A, the actuator assembly 26 is similar to the actuator assembly 26 described above with respect to FIG. 4, except for the features described below. The actuator assembly 26 includes a plurality of blocks 132. Each of the blocks 132 is directly coupled to the innermost mirror surface 19 of the mirror 16 to enhance the structural integrity of the actuator assembly 26. The actuator assembly 26 includes the actuator housing 30 and the plurality of legs 34 that extend directly from the actuator housing 30 as described above with respect to FIG. 4. The actuator assembly 26 further includes a plurality of linear solenoids 140. The linear solenoids 140 include a stationary portion 141 and a movable portion 143 movable relative to the stationary portion 141. The stationary portion 141 is directly coupled to the second leg end 38 of a respective leg 34 to enhance the structural integrity of the actuator assembly 26. The movable portion 143 includes a shaft 145 and a disc 147 directly coupled to the shaft 145. The shaft 145 and the disc 147 are configured to move linearly relative to the stationary portion 141 in the direction indicated by arrow L upon actuation of the linear solenoid 140. Each block 132 defines a slot 133 sized to receive the disc 147 of the linear solenoid 140. The slot 133 of the block 132 receives the disc 147, thereby allowing each block 132 to move linearly along with the movable portion 143 of the linear solenoid 140 upon actuation of the linear solenoid 140. Thus, each of the linear solenoids 140 is directly and permanently coupled to one of the blocks 132. The actuator assembly 26 further includes the plurality of wires 42, which are electrically connected to the linear solenoids 140. As such, each linear solenoid 140 is configured to receive electrical energy to pull the blocks 132 toward the second leg 38 of the respective leg 34 to bend the mirror 16 from the flat shape to the fisheye shape. In other words, upon receipt of electrical energy, the linear solenoid 140 actuates to pull the blocks 132 toward the second leg end 38 of each leg 34, thereby bending the mirror 16 from the flat shape to the fisheye shape. When the linear solenoids 140 no longer receive electrical energy, the linear solenoids 140 deactivate, causing the blocks 132 to move away from the second leg end 38. As a result, the mirror 16 bends from the fisheye shape to the flat shape.

Figure 6:
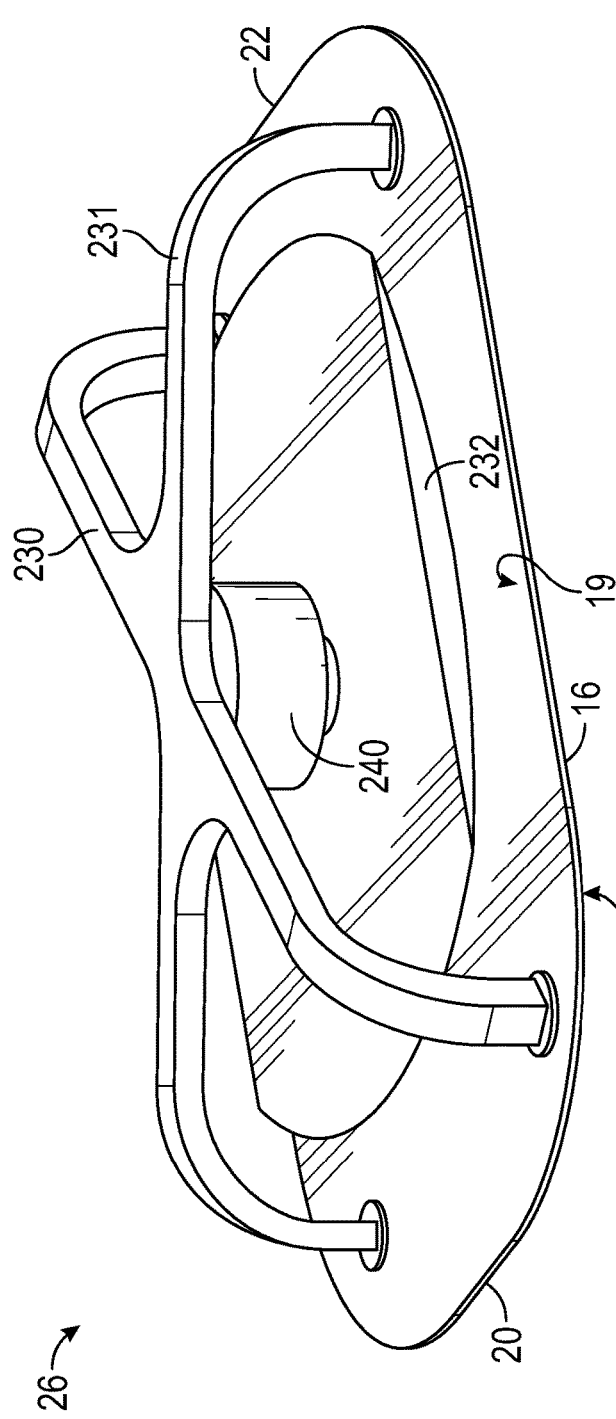
FIG. 6 is a schematic isometric view of a mirror assembly in accordance with an aspect of the present disclosure, wherein the mirror assembly includes a fisheye-shaped block.
Figure 7:
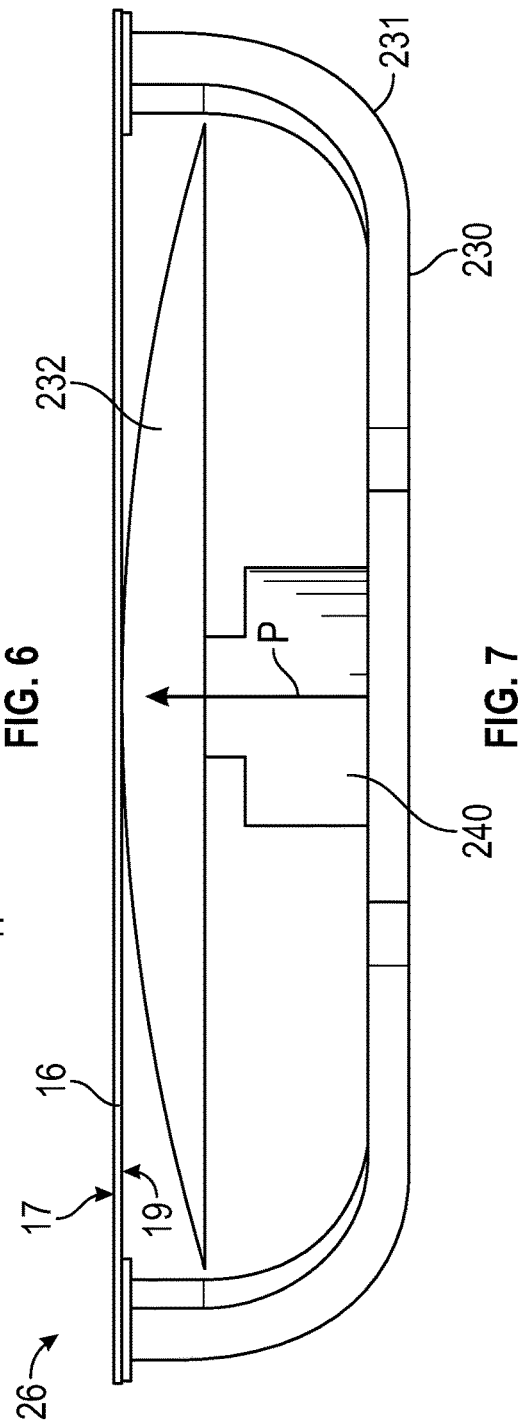
FIG. 7 is a schematic front view of the mirror assembly of FIG. 6.

With reference to FIGS. 6 and 7, the actuator assembly 26 includes a single block 232 in order to minimize part count. The single block 232 is in direct contact with the innermost mirror surface 19 and has a fisheye shape that resembles the fisheye shape of the mirror 16. As a result, when the single block 232 is moved linearly toward the mirror 16, the mirror 16 changes its shape from the flat shape to the fisheye shape. The actuator assembly 26 includes an actuator housing 230 that is configured as a bracket 231. The bracket 231 is directly coupled to the innermost mirror surface 19 at spaced apart locations. The actuator assembly includes a single linear solenoid 240 disposed between the bracket 231 and the single block 232. Thus, the single linear solenoid 240 is coupled between the actuator housing 230 (i.e., bracket 231) and the single block 232. The bracket 231 may be referred to as a mirror holder and is configured to rotate about another bracket that is fixed to the vehicle 10 to allow customer adjustment of the mirror 16. The single linear solenoid 240 is configured to receive electrical energy to push the single block 232 in the direction indicated by arrow P, causing the mirror 16 to bend from the flat shape to the fisheye shape. When the single linear solenoid 240 no longer receives electrical energy, the mirror 16 returns to its flat shape.

Figure 8:
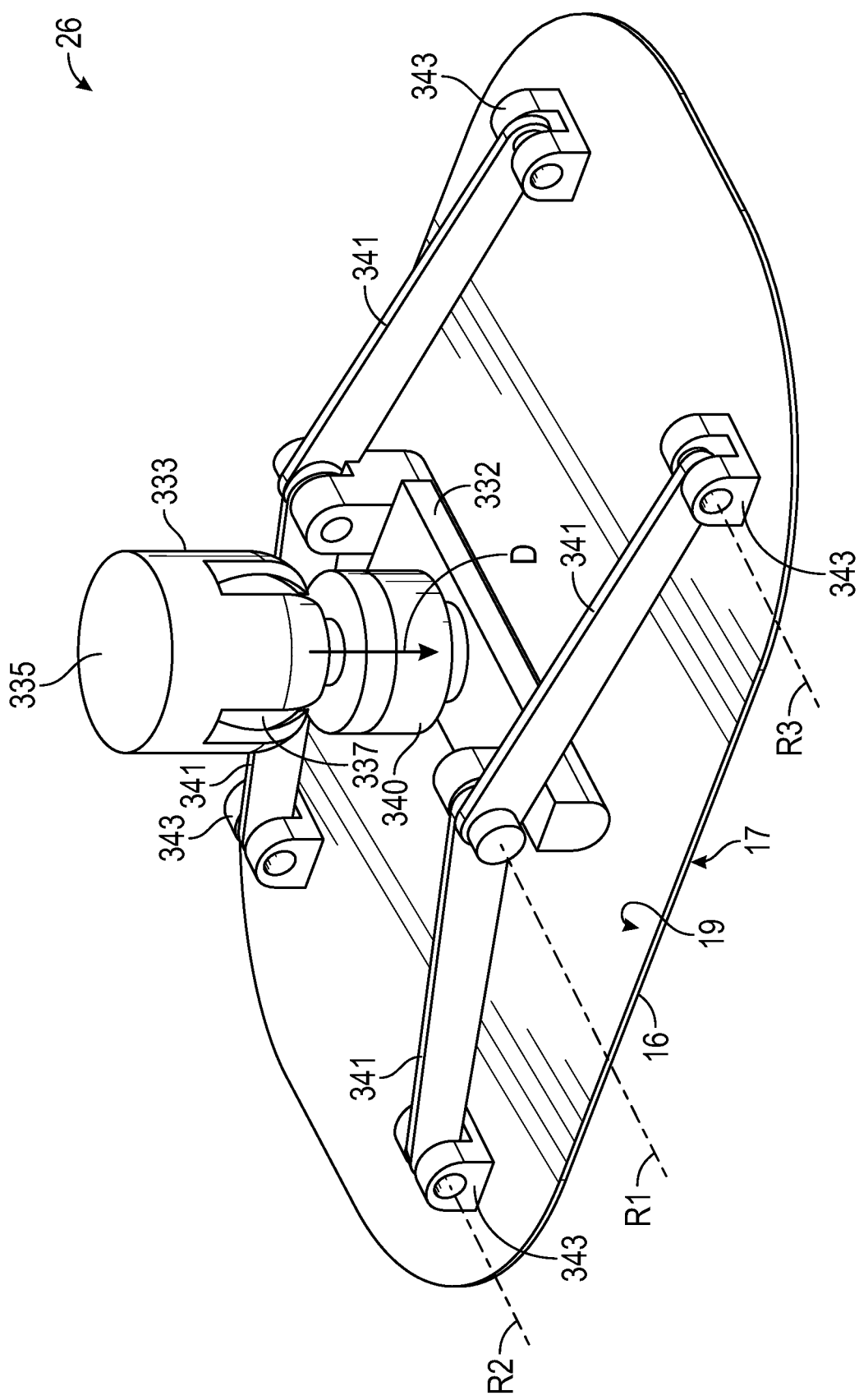
FIG. 8 is a schematic isometric view of a mirror assembly in accordance with an aspect of the present disclosure.

With reference to FIG. 8, the actuator assembly 26 includes a block 332 that is in direct contact with the innermost mirror surface 19 of the mirror 16. The actuator assembly 26 includes a universal joint 333 to allow rotation of the mirror 16 about at least two axes. The universal joint 333 includes a joint housing 335 and a sphere 337 (i.e., a ball) rotatable relative to the joint housing 335. The actuator assembly 26 further includes a single linear solenoid 340 directly coupled to the universal joint 333. The linear solenoid 240 is directly coupled to the block 332 to allow the block 332 to push the mirror 16 upon receipt of electrical energy, causing the mirror 16 to bend from the flat shape to the fisheye shape. The actuator assembly 26 further includes a linkage 339 coupled between the innermost mirror surface 19 of the mirror 16 and the block 332. The linkage 339 includes four links 341. Each of the four links 341 is rotatably coupled to the block 332. Accordingly, the links 341 are configured to rotate relative to the block 332 about a first axis of rotation R1. The actuator assembly 26 further includes four devises 343 each pivotally coupled to a respective link 341. Two links 341 are configured to rotate relative to two devises about a second axis of rotation R2. Two other links 341 are configured to rotate relative to two devises about a third axis of rotation R3. The linear solenoid 340 is configured to receive electrical energy to push the single block 332 in the direction indicated by arrow D, causing the mirror 16 to bend from the flat shape to the fisheye shape. As the block 332 pushes the mirror 16, the links 341 rotate about the first axis of rotation R1, the second axis of rotation R2, and the third axis of rotation R3. When the single linear solenoid 340 no longer receives electrical energy, the mirror 16 returns to its flat shape.

Figure 9:
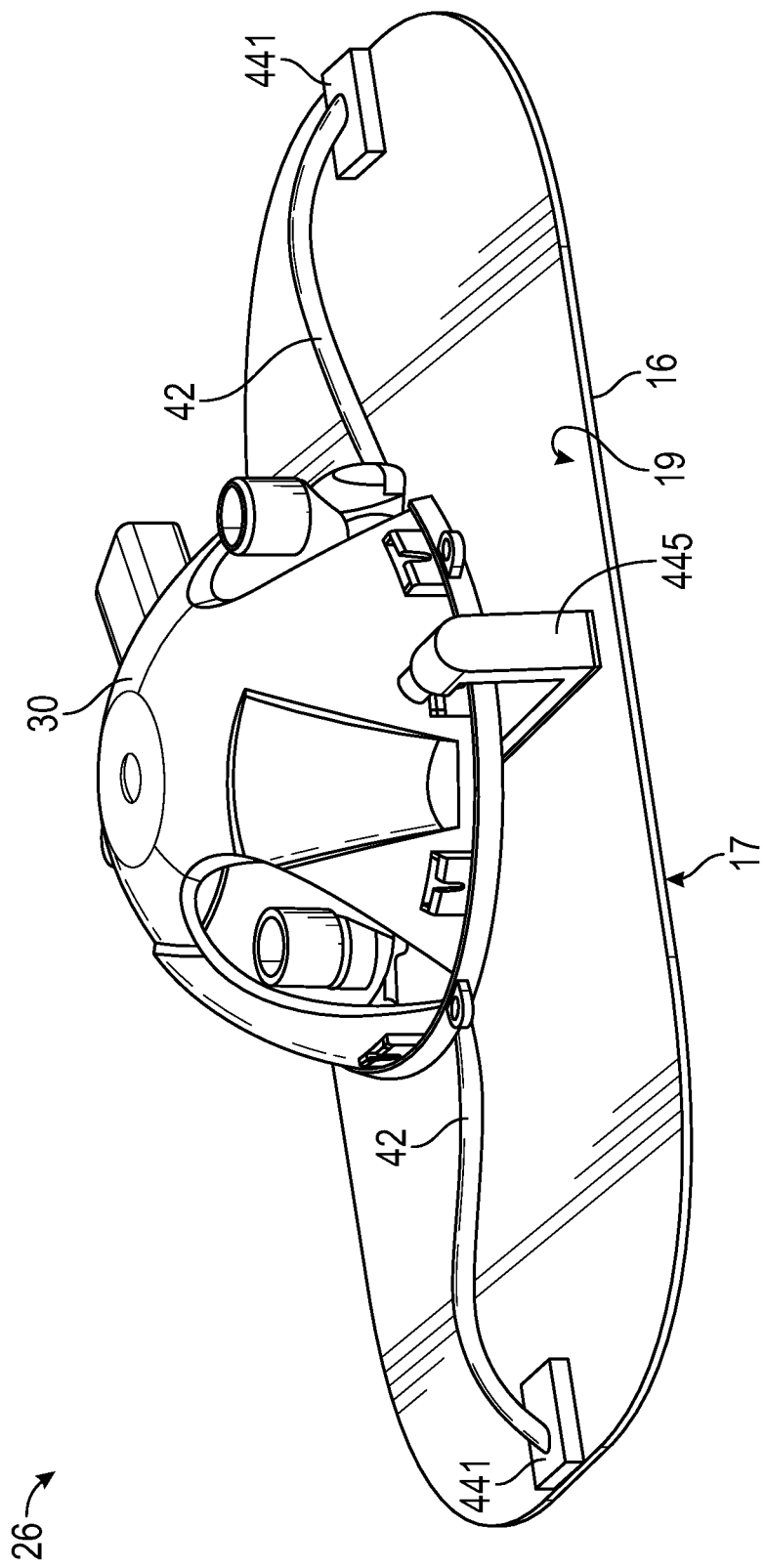
FIG. 9 is a schematic isometric view of a mirror assembly in accordance with an aspect of the present disclosure, wherein the mirror of the mirror assembly is wholly or partly made of an electroactive polymer.

With reference to FIG. 9, the actuator assembly 26 includes the actuator housing 30, which is coupled to the mirror 16. The actuator assembly 26 includes one or more wires 42 to carry electrical energy. Further, the actuator assembly 26 includes one or more electrical pads or contacts 441 configured to carry electrical energy. The electrical pads 441 are electrically connected to one or more wires 42. Each electrical pad 441 is directly connected to the innermost mirror surface 19 to supply the mirror 16 with the electrically energy carried by the wires 42. The wires 42 are electrically connected to the power supply 37 (FIG. 5). The mirror 16 is wholly or partly made of an electroactive polymer. As such, upon receipt of electrical energy, the shape of the mirror changes from the flat shape to the fisheye shape. When the mirror 16 no longer receives electrical energy, the mirror 16 bends from the fisheye shape to the flat shape. The actuator housing 30 allows rotation of the mirror 16 and is connected to the mirror 16 with an adhesive 445.

Figure 10:
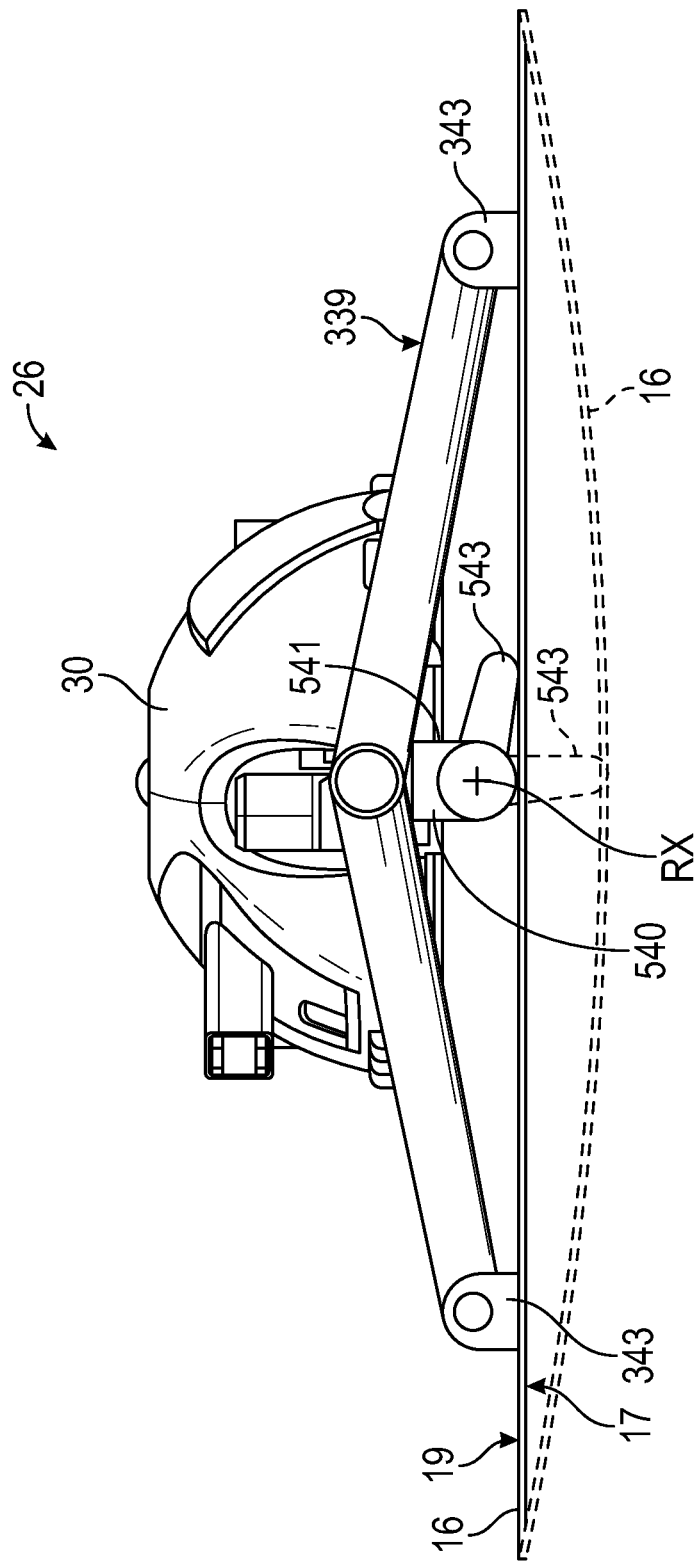
FIG. 10 is a schematic isometric view of a mirror assembly in accordance with an aspect of the present disclosure, wherein the mirror assembly includes an electric motor and a cam.

With reference to FIG. 10, the actuator assembly 26 includes a linkage 339 (as described above with respect to FIG. 8) coupled to the innermost mirror surface 19. The actuator housing 30 of the actuator assembly 26 is directly coupled to the linkage 339. The actuator assembly 26 further includes an electric motor 540 (i.e., an eccentric servo motor) including a motor housing 541 and a cam 543. Upon activation of the electric motor 540, the cam 543 rotates about 90 degrees to push the mirror 16 outwards. In other words, upon activation of the electric motor 540, the cam 543 rotates 90 degrees relative to a rotation axis RX that extends through the center of the motor housing 541. As a result, the mirror 16 bends from the flat shape to the fisheye shape. Upon deactivation of the electric motor 540, the cam 543 returns to its original position, causing the mirror 16 to bend from the fisheye shape to the flat shape.

Figure 11:
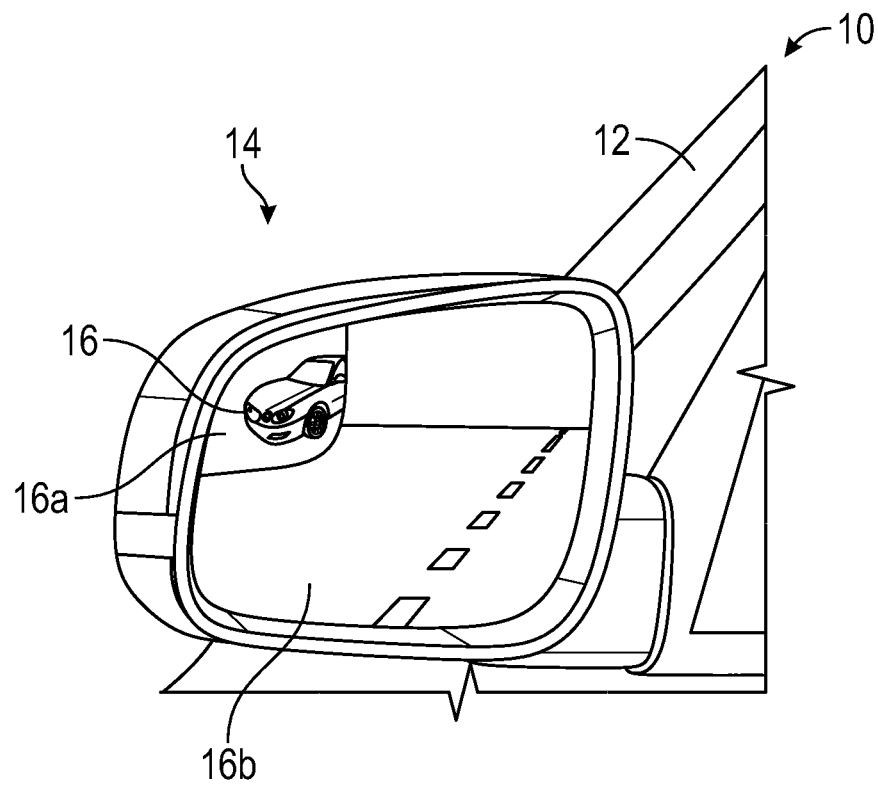
FIG. 11 is a schematic isometric view of a mirror assembly in accordance with an aspect of the present disclosure, wherein the mirror includes a bendable portion.

With reference to FIG. 11, the mirror assembly 14 includes a mirror 16 capable of bending between a flat shape and a fisheye shape as discussed above. However, in this embodiment, only a portion of the mirror 16 bends. Stated differently, only a portion of the mirror 16 is bendable between the flat shape and the fisheye shape, and a reminder of the mirror 16 remains flat. In particular, the mirror 16 includes a first mirror portion 16a capable of bending and a second mirror portion 16b that is uncapable of bending. The first mirror portion 16a be may a corner portion of the mirror 16, a lower portion of the mirror 16, or a side portion of the mirror 16.

Figure 12:
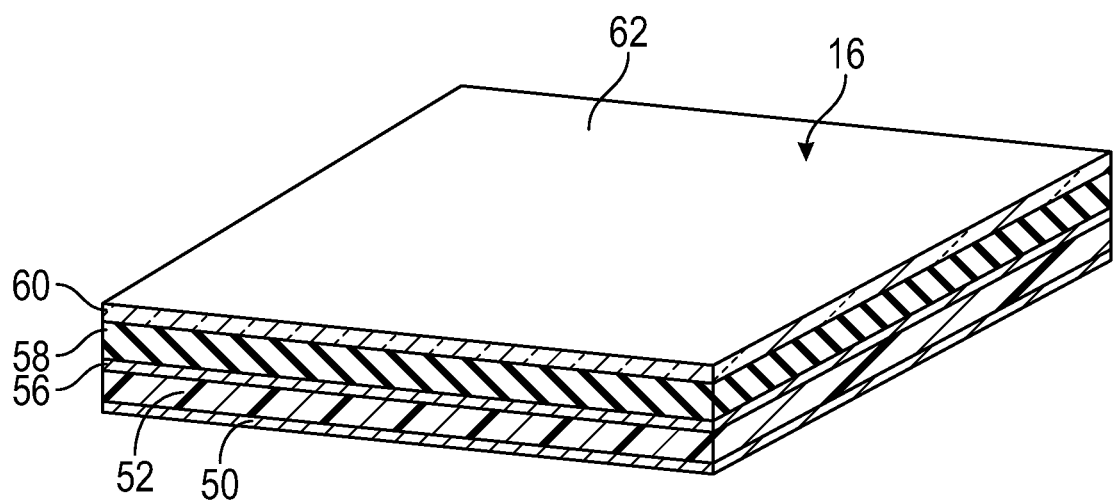
FIG. 12 is a schematic isometric view of a mirror in accordance with an aspect of the present disclosure, wherein the mirror includes a coating layer, and the coating layer includes silica and polytetrafluoroethylene.

With reference to FIG. 12, the mirror 16 includes a first layer 50 wholly or partly made of aluminum to provide structural support. The mirror 16 includes a second layer 52 disposed directly on the first layer 50. The second layer is wholly or partly made of foamed plastic. The mirror 16 includes a third layer 56 disposed directly on the second layer 52. The third layer 56 is wholly or partly made of aluminum. The mirror 16 includes a fourth layer 58 disposed directly on the third layer 56. The fourth layer 58 is wholly or partly made of a shook-proof polystyrene to provide shock-proof properties to the mirror 16. The mirror 16 includes a fifth layer 60 disposed directly on the fourth layer 58. The fifth layer 60 is a polyethylene terephthalate (PET) film with an aluminum dusting. The mirror 16 includes a sixth layer 62 (i.e., a coating layer) for protecting the mirror 16 against rain and snow. To do so, the sixth layer 62 includes silica and polytetrafluoroethylene (PTFE). As such, the sixth layer 62 (i.e., the coating layer) is hydrophobic and resistive to acid. The sixth layer 62 may be made of a co-polymer of silica and PTFE. The PTFE is resistive to acid to improve the durability, and silica provides extra mechanical strength to the flexible mirror 16. Alternatively, the sixth layer 62 may be formed by a layer of silica and a layer of PTFE stacked together.

Figure 13:
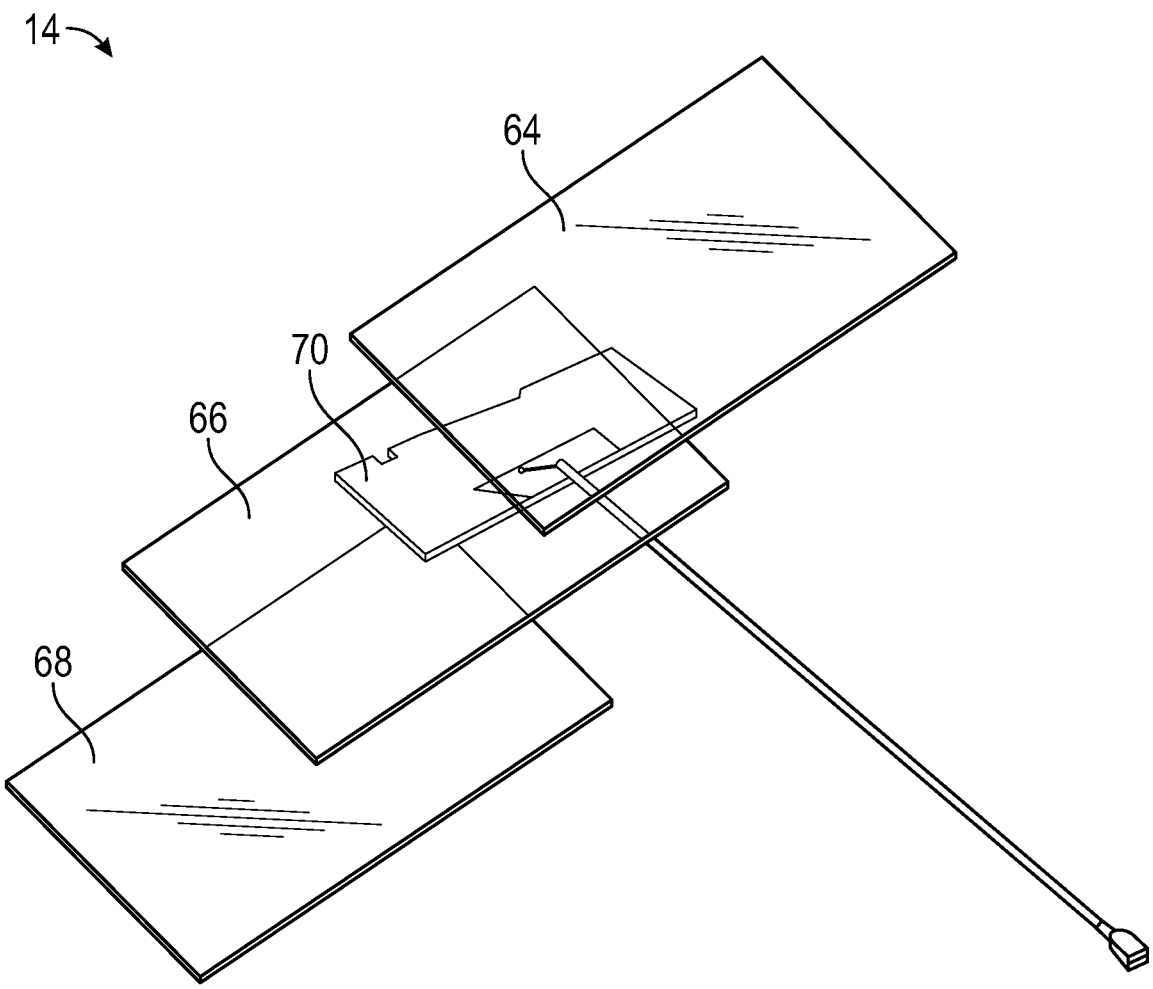
FIG. 13 is a schematic isometric view of a mirror in accordance with an aspect of the present disclosure, wherein the mirror includes an antenna.
Figure 14:
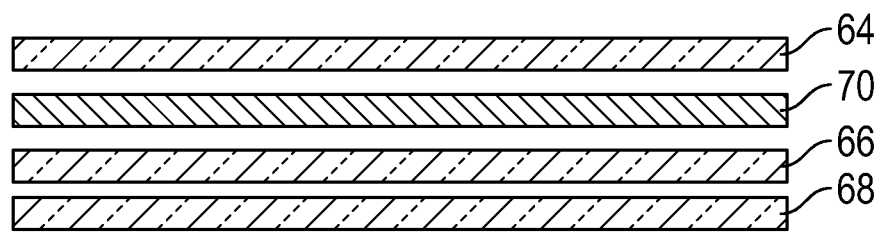
FIG. 14 is a schematic sectional view of the mirror of FIG. 13.

With reference to FIGS. 13 and 14, the mirror assembly 14 includes an outer mirror layer 64, a polymeric layer 66, an inner mirror layer 68, and an antenna 70 disposed between the outer mirror layer 64 and the polymeric layer 68. The antenna 70 allows radio transmissions. Alternatively, the mirror assembly 14 includes one mirror layer (e.g., outer mirror layer 64) that is coated with a material, such as stainless steel, stainless silver, aluminum or an alloy thereof. This mirror layer coated with a material, such as stainless steel, stainless silver, aluminum, or an alloy thereof, may optionally be used as both, a mirror layer and as an antenna layer for radio, 4G & 5G services. The combined mirror and antenna layer based on aluminum can be heated, thereby allowing the mirror assembly 14 to be heated cold environments. In the depicted embodiment, the outer mirror layer 64 may be a combined mirror and antenna layer.

Figure 15:
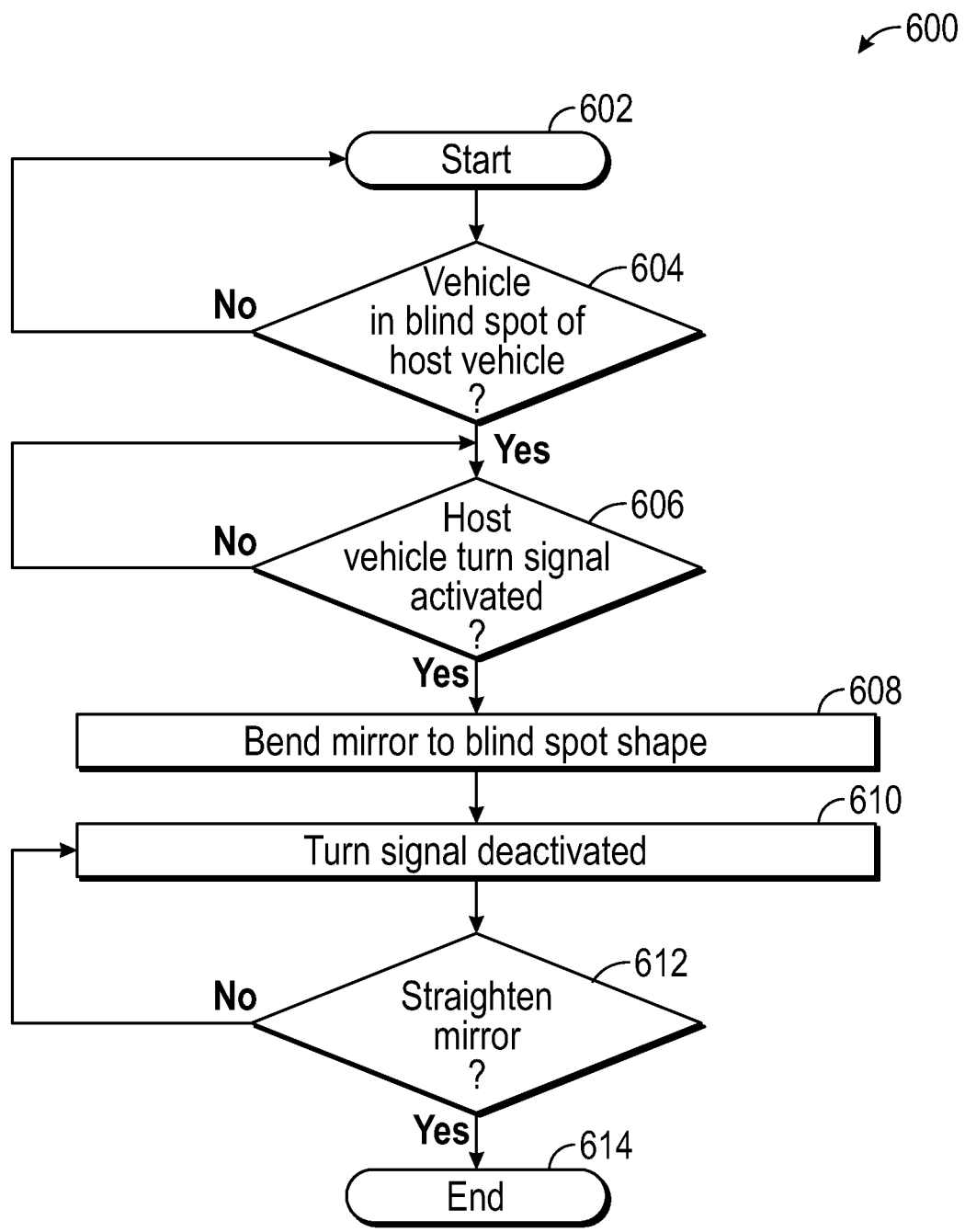
FIG. 15 is a flowchart of a method of using a mirror assembly in accordance with an aspect of the present disclosure.
Figure 16:
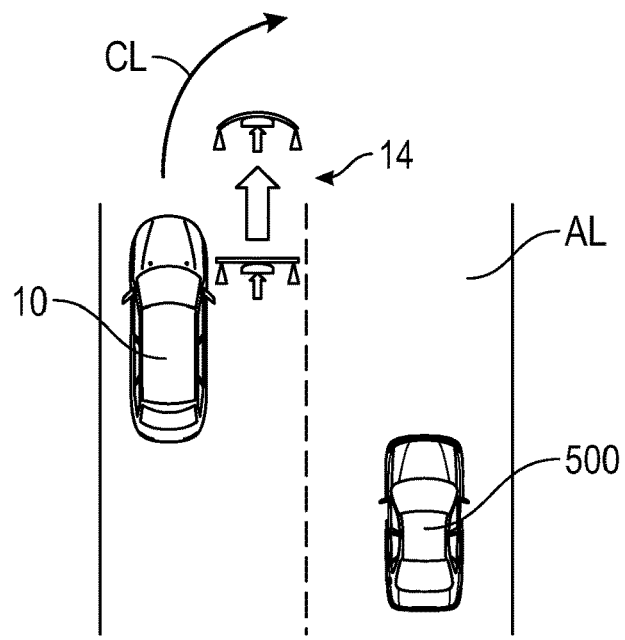
FIG. 16 is a schematic illustration showing how to use a mirror assembly in accordance with an aspect of the present disclosure.

FIG. 15 is a flowchart of a method 600 for using the mirror assembly 14, and FIG. 16 is a schematic illustration of the vehicle 10 (i.e., a host vehicle) with the mirror assembly 14 that bends to allow the driver to observe an adjacent lane AL and a secondary vehicle 500 driving along the adjacent lane AL before changing lanes (as indicated by arrow CL). The controller 35 is programmed to execute the method 600. The method 600 begins at start block 602. Then, the method 600 proceeds to block 604. At block 604, the controller 35 determines whether the secondary vehicle 500 is in the blind spot of the host vehicle 10. To do so, the controller 35 may use the blind spot sensor (i.e., part of the sensors 29). If no secondary vehicle 500 is in the blind spot, then the method 600 returns to block 602. If the controller 35 determines that the secondary vehicle 500 is in the blind spot, then the method 600 continues to block 606. At block 606, the controller 35 determines whether a turn signal of the host vehicle 10 has been activated. If the turn signal of the host vehicle 10 has not been activated, then the method 600 iteratively executes block 606. If the turn signal of the host vehicle 10 has been activated, the method 600 proceeds to block 608, where the controller 35 commands the mirror assembly 14 to bend from the flat shape to the fisheye shape (i.e., the blind spot shape). Then, the method 600 continues to block 610. At block 610, the controller 35 determines whether the turn signal of the host vehicle 10 has been deactivated. The method 600 continues to block 612. At block 612, the controller 35 commands the mirror assembly 14 to bend the mirror from the fisheye shape to the flat shape in response to determining that the turn signal of the host vehicle 10 has been deactivated. Otherwise, the method 600 returns to block 610. After block 612, the method 600 ends at end block 614.

Figure 17:
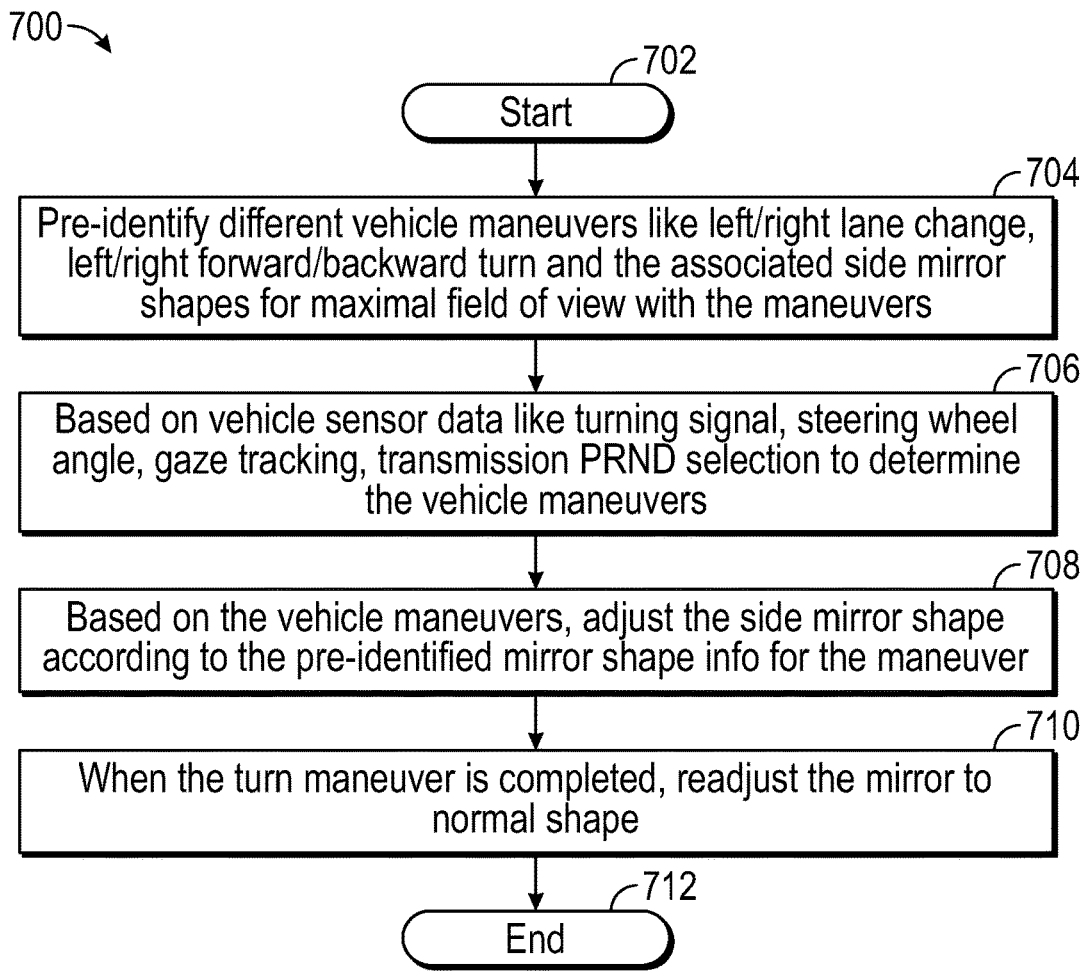
FIG. 17 is a schematic flowchart of a method of using a mirror assembly in accordance with an aspect of the present disclosure.

FIG. 17 is a flowchart of a method 700 of using the mirror assembly 14. The method 700 begins at start block 702. Then, the method 700 continues to block 704. At block 704, different predetermined vehicle maneuvers are identified by testing vehicles. The predetermined vehicle maneuvers may include, but are not limited to, left/right lane change, left/right, forward/backward turn. Also, different side mirror shapes are associated with the predetermined vehicle maneuvers to maximize the field of view of during the different, predetermined vehicle maneuvers. Then, the method 700 continues to block 706. At block 706, the controller 35 receives sensor data. The controller 35 receives sensor data from the sensor 29. The sensor data may include turning signal, steering wheel angle, gaze tracking, transmission PRND selection, among others. Based on the sensor data, controller 35 determines the vehicle maneuvers. Specifically, the controller 35 determines which vehicle maneuver the host vehicle 10 is currently performing based on the sensor data and the predetermined vehicle maneuvers stored on the controller 35. In other words, the controller 35 compares the current sensor data with the data associated with the predetermined vehicle maneuvers to determine which of the stored predetermined vehicle maneuvers the host vehicle 10 is currently performing. The method 700 then proceeds to block 708. At block 708, the controller 35 commands the mirror assembly 14 to adjust the shape of the mirror 16 from the flat shape to the fisheye shape based on the identified vehicle maneuver. Then, the method 700 continues to block 710. At block 710, the controller 35 commands readjusting the shape of the mirror 16 from the fisheye shape to the flat shape upon completion of the vehicle maneuver of the host vehicle 10. Then, the method 700 ends at block 712.

While the best modes for carrying out the teachings have been described in detail, those familiar with the art to which this disclosure relates will recognize various alternative designs and embodiments for practicing the teachings within the scope of the appended claims. The vehicle 10 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. The phrase "at least one of" as used herein should be construed to include the non-exclusive logical "or", i.e., A and/or B and so on depending on the number of components.

What is claimed is:

1. A mirror assembly for a vehicle, comprising:
a mirror housing;
a mirror supported by the mirror housing, wherein the mirror has an outer reflective surface, and the mirror is bendable between a flat shape and a fisheye shape;
an actuator assembly coupled to the mirror; and
wherein, upon actuation, the actuator assembly is configured to bend the mirror between the flat shape and the fisheye shape to adjust a field of view of the mirror;
a controller in communication with the mirror, wherein the mirror assembly is part of a host vehicle, and the controller is programmed to:
determine whether a secondary vehicle is in a blind spot of the host vehicle;
in response to determining that the secondary vehicle is in the blind spot of the host vehicle, determining whether a turn signal of the host vehicle has been activated;
in response to determining that the turn signal has been activated, bend the mirror from the flat shape to the fisheye shape;
determine whether the turn signal of the host vehicle has been deactivated; and
in response to determining whether the turn signal of the host vehicle has been deactivated, bend the mirror from the fisheye shape to the flat shape
wherein:
the field of view of the mirror is greater when the mirror has the fisheye shape than when the mirror has the flat shape;
when the mirror has the flat shape, the outer reflective surface has a first curvature;
when the mirror has the fisheye shape, the outer reflective surface has a second curvature;
the second curvature is greater than the first curvature; and
the first curvature is zero.

2. The mirror assembly of claim 1, wherein:
the mirror has an innermost mirror surface;
the innermost mirror surface is opposite the outer reflective surface;
the actuator assembly further includes a plurality of permanent magnets;
each of the plurality of permanent magnets is directly coupled to the innermost mirror surface of the mirror;
the actuator assembly includes an actuator housing and a plurality of legs extending directly from the actuator housing;
each of the plurality of legs includes a first leg end and a second leg end opposite the first leg end;
the first leg end of each of the plurality of legs is directly coupled to the actuator housing;
the second leg end of each of the plurality of legs is spaced apart from the actuator housing;
the actuator assembly further includes a plurality of electromagnets;
each of the plurality of electromagnets is directly coupled to the second leg end of one of the plurality of legs;
each of the plurality of electromagnets is disposed adjacent one of the plurality of permanent magnets;
the actuator assembly further includes a plurality of wires;
each of the plurality of wires is electrically connected to one of the plurality of electromagnets; and
the plurality of electromagnets is configured to receive electrical energy to draw the plurality of permanent magnets toward the plurality of electromagnets to bend the mirror from the flat shape to the fisheye shape.

3. The mirror assembly of claim 1, wherein:
the mirror has an innermost mirror surface;
the innermost mirror surface is opposite the outer reflective surface;
the actuator assembly further includes a plurality of blocks;
each of the plurality of blocks is directly coupled to the innermost mirror surface of the mirror;
the actuator assembly includes an actuator housing and a plurality of legs extending directly from the actuator housing;
each of the plurality of legs includes a first leg end and a second leg end opposite the first leg end;
the first leg end of each of the plurality of legs is directly coupled to the actuator housing;
the second leg end of each of the plurality of legs is spaced apart from the actuator housing;
the actuator assembly further includes a plurality of linear solenoids;
each of the plurality of linear solenoids is directly coupled to the second leg end of one of the plurality of legs;
each of the plurality of linear solenoids is directly and permanently coupled to one of the plurality of the blocks;
the actuator assembly further includes a plurality of wires;
each of the plurality of wires is electrically connected to one of the plurality of linear solenoids; and
the plurality of linear solenoids is configured to receive electrical energy to pull the plurality of blocks toward the second leg end of the respective one of the plurality of legs to bend the mirror from the flat shape to the fisheye shape.

4. The mirror assembly of claim 1, wherein:
the mirror has an innermost mirror surface
the innermost mirror surface is opposite the outer reflective surface;
the actuator assembly further includes a single block;
the single block has a fisheye shape;
the single block is in direct contact with the innermost mirror surface;
the actuator assembly includes an actuator housing;
the actuator housing is coupled to the mirror at the innermost mirror surface;
the actuator housing is configured as a bracket;
the actuator assembly includes a single linear solenoid;

the single linear solenoid is coupled between the actuator housing and the single block; and the single linear solenoid is configured to receive electrical energy to push the single block, causing the mirror to bend from the flat shape to the fisheye shape.

5. The mirror assembly of claim 1, wherein:
the mirror has an innermost mirror surface
the innermost mirror surface is opposite the outer reflective surface;
the actuator assembly includes a block;
the block is in direct contact with the innermost mirror surface;
the actuator assembly includes a universal joint to allow rotation of the mirror;
the actuator assembly includes a linear solenoid coupled to the universal joint;
the linear solenoid is directly coupled to the block to allow the block to push the mirror upon receipt of electrical energy;
the actuator assembly includes a linkage coupled between the innermost mirror surface and the block; and
the linear solenoid is configured to receive electrical energy to push the block, causing the mirror to bend from the flat shape to the fisheye shape.

6. The mirror assembly of claim 1, wherein:
the mirror has an innermost mirror surface;
the innermost mirror surface is opposite the outer reflective surface;
the actuator assembly includes an actuator housing coupled to the mirror;
the actuator assembly includes a plurality of wires configured to carry electrical energy;
the actuator assembly includes a plurality of electrical pads configured to carry electrical energy;
each of the plurality of electrical pads is connected to one of the plurality of wires;
each of the plurality of electrical pads is directly coupled to the innermost mirror surface of the mirror to supply the mirror with the electrical energy carried by the plurality of wires; and
the mirror comprises an electroactive polymer such that, upon receipt of the electrical energy, a shape of the mirror changes from the flat shape to the fisheye shape.

7. The mirror assembly of claim 1, wherein:
the mirror has an innermost mirror surface;
the innermost mirror surface is opposite the outer reflective surface;
the actuator assembly includes a linkage coupled to the innermost mirror surface;
the actuator assembly includes an actuator housing coupled to the linkage;
an electric motor including a motor housing and a cam; and
upon receipt of electric energy, the cam rotates about a rotational axis to push the mirror, causing the mirror to bend from the flat shape to the fisheye shape.

8. The mirror assembly of claim 1, wherein only a portion of the mirror is bendable between the flat shape and the fisheye shape, and a reminder of the mirror remains flat.

9. The mirror assembly of claim 1, wherein the mirror includes a coating layer, wherein the coating layer includes silica and polytetrafluoroethylene such that the coating layer is hydrophobic and resistive to acid.

10. The mirror assembly of claim 1, wherein the mirror is a flexible liquid-crystal display (LCD).

11. The mirror assembly of claim 1, wherein the mirror includes an outer mirror layer, a polymeric layer, and an antenna disposed between the outer mirror layer and the polymeric layer.

12. The mirror assembly of claim 1, wherein the mirror includes a combined mirror and antenna layer.

13. The mirror assembly of claim 1, further comprising a controller in communication with the mirror, wherein the mirror assembly is part of a host vehicle, and the controller is programmed to:
receiving sensor data;
determine a vehicle maneuver of the host vehicle based on the sensor data and a plurality of predetermined vehicle maneuvers;
adjust a shape of the mirror from the flat shape to the fisheye shape based on the vehicle maneuver; and
readjust the shape of the mirror from the fisheye shape to the flat shape upon completion of the vehicle maneuver.

14. A host vehicle, comprising:
a vehicle body;
a mirror housing coupled to the vehicle body;
a mirror supported by the mirror housing, wherein the mirror has an outer reflective surface, and the mirror is bendable between a flat shape and a fisheye shape;
an actuator assembly coupled to the mirror; and
wherein, upon actuation, the actuator assembly is configured to bend the mirror between the flat shape and the fisheye shape to adjust a field of view of the mirror;
a controller in communication with the mirror, wherein the mirror is part of the host vehicle, and the controller is programmed to:
receiving sensor data;
determine a vehicle maneuver of the host vehicle based on the sensor data and a plurality of predetermined vehicle maneuvers;
adjust a shape of the mirror from the flat shape to the fisheye shape based on the vehicle maneuver; and
readjust the shape of the mirror from the fisheye shape to the flat shape upon completion of the vehicle maneuver;
wherein:
the field of view of the mirror is greater when the mirror has the fisheye shape than when the mirror has the flat shape;
when the mirror has the flat shape, the outer reflective surface has a first curvature;
when the mirror has the fisheye shape, the outer reflective surface has a second curvature;
the second curvature is greater than the first curvature; and the first curvature is zero.

15. The vehicle of claim 14, wherein:
the mirror has an innermost mirror surface;
the innermost mirror surface is opposite the outer reflective surface;
the actuator assembly further includes a plurality of permanent magnets;
each of the plurality of permanent magnets is directly coupled to the innermost mirror surface of the mirror;
the actuator assembly includes an actuator housing and a plurality of legs extending directly from the actuator housing;
each of the plurality of legs includes a first leg end and a second leg end opposite the first leg end;
the first leg end of each of the plurality of legs is directly coupled to the actuator housing;
the second leg end of each of the plurality of legs is spaced apart from the actuator housing;

the actuator assembly further includes a plurality of electromagnets;

each of the plurality of electromagnets is directly coupled to the second leg end of one of the plurality of legs;

each of the plurality of electromagnets is disposed adjacent one of the plurality of permanent magnets;

the actuator assembly further includes a plurality of wires;

each of the plurality of wires is electrically connected to one of the plurality of electromagnets; and the plurality of electromagnets is configured to receive electrical energy to draw the plurality of permanent magnets toward the plurality of electromagnets to bend the mirror from the flat shape to the fisheye shape.

16. The vehicle of claim 14, wherein:

the mirror has an innermost mirror surface;

the innermost mirror surface is opposite the outer reflective surface;

the actuator assembly further includes a plurality of blocks;

each of the plurality of blocks is directly coupled to the innermost mirror surface of the mirror;

the actuator assembly includes an actuator housing and a plurality of legs extending directly from the actuator housing;

each of the plurality of legs includes a first leg end and a second leg end opposite the first leg end;

the first leg end of each of the plurality of legs is directly coupled to the actuator housing;

the second leg end of each of the plurality of legs is spaced apart from the actuator housing;

the actuator assembly further includes a plurality of linear solenoids;

each of the plurality of linear solenoids is directly coupled to the second leg end of one of the plurality of legs;

each of the plurality of linear solenoids is directly and permanently coupled to one of the plurality of the blocks;

the actuator assembly further includes a plurality of wires;

each of the plurality of wires is electrically connected to one of the plurality of linear solenoids; and the plurality of linear solenoids is configured to receive electrical energy to pull the plurality of blocks toward the second leg end of the respective one of the plurality of legs to bend the mirror from the flat shape to the fisheye shape.

* * * * *